United States Patent Office 2,962,583
Patented Nov. 29, 1960

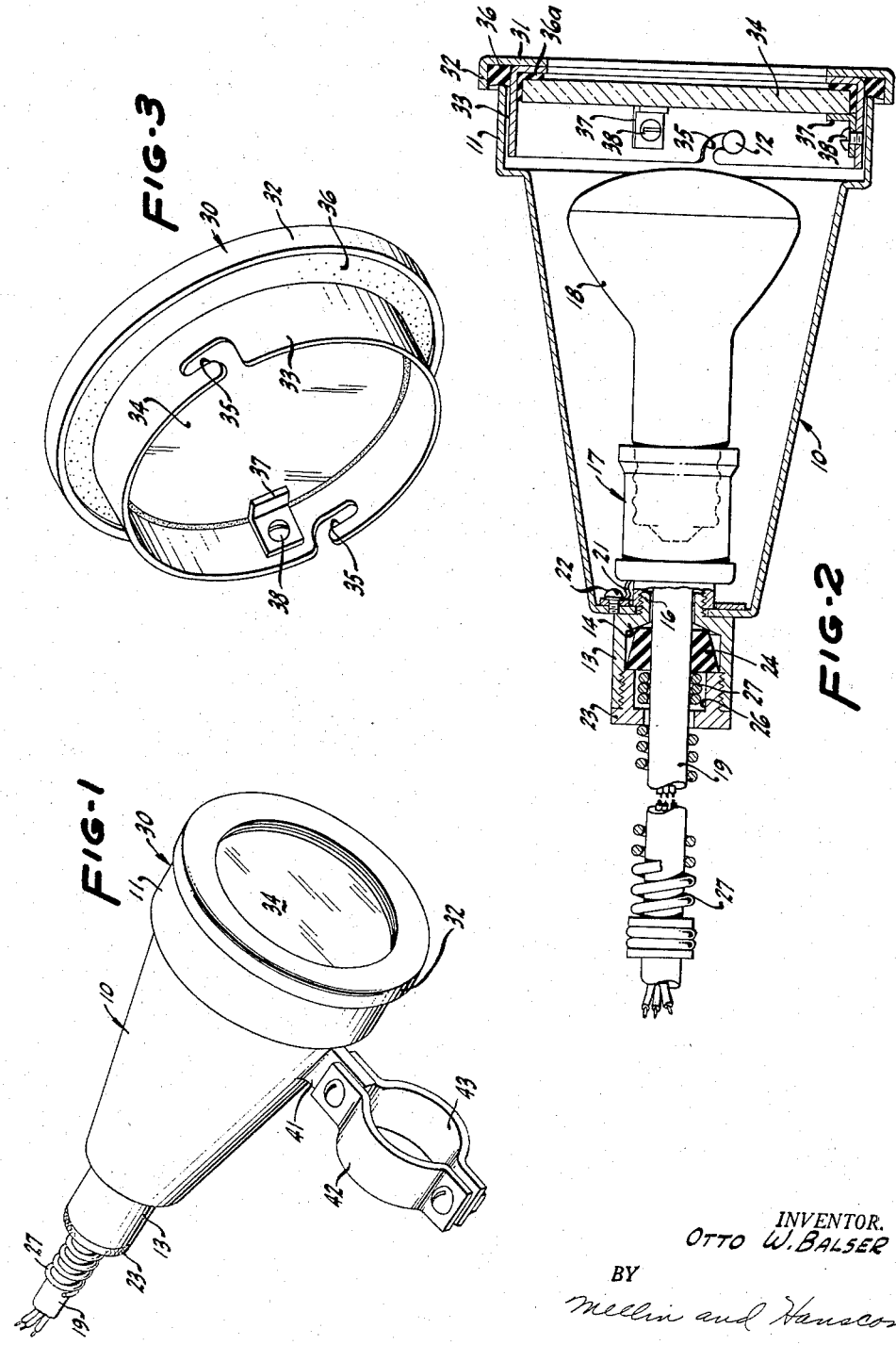

2,962,583

LAMP CONSTRUCTION FOR USE WITH SAND BLASTING EQUIPMENT

Otto W. Balser, 1830 34th Ave., San Francisco, Calif.

Filed Sept. 8, 1958, Ser. No. 759,549

2 Claims. (Cl. 240—11.2)

This invention relates to a lamp construction and more particularly to a sealed lamp construction for use in sand blasting operations.

In many instances it is very desirable to have a light source at the immediate vicinity of sand blasting operations so that the workman can see how the work is progressing, and it has been attempted to attach a lamp to a sand blasting nozzle for this purpose. However, the lamps used in the past have not proven very successful as the sand used in the sand blasting operations is injurious to such lamps and has caused relatively quick failure of these lamps. It is the principal object of this invention to provide a lamp construction in which the light source is completely sealed from contact with the sand so as to eliminate the detrimental effects thereof.

Another object is to provide a lamp construction which is rugged and which is economical of manufacture.

Other objects and advantages will become apparent in the course of the following detailed description.

In the drawings, forming a part of this application, and in which like parts are designated by like reference numerals throughout the same, Fig. 1 is a perspective view of a lamp constructed in accordance with the invention.

Fig. 2 is a cross-sectional view of the invention.

Fig. 3 is a perspective view of the removable cover.

Referring now to the drawings, the lamp comprises a tapered tubular member 10 having a cylindrical portion 11 at its large end. Two inwardly extending pins 12 are fixed to the large end cylindrical portion.

The small end of housing 10 is inturned to form a seat for the cylindrical packing gland 13 which has an inwardly extending flange 14 and a threaded portion 16 projecting into the interior of the housing member. A conventional light bulb socket 17 threadedly connects to the packing gland. When so connected, the gland 13 is rigidly secured to the housing member and forms a cylindrical extension thereof at its small end. A suitable light bulb 18 is screwed into the socket 17. As shown, the bulb 18 is of the built in reflector type which is commercially available.

A rubber covered three-conductor cable 19 extends through the gland 13 into socket 17, and is provided with a ground wire 21 which is attached by screw 22 to the housing 10.

An annular packing retainer nut 23 is threaded into the end of packing gland 13 to compress the resilient packing member 24 tightly against the gland and the cable. When so compressed, the packing member 24 serves to anchor the cable to the housing to prevent strain on the cable connections to the socket, and also serves to seal off the interior of the housing so that no sand can get thereinto. The retainer nut is recessed at 26 to provide an anchor for the end of the conventional protective coil spring 27 wrapped around the cable.

The removable cover 30 is formed with a flat ring portion 31 having its outer periphery upturned to form an outer flange 32. An annular member, L-shaped in cross section, is welded to ring 31 to provide an inner flange 33 projecting at right angles to ring 31 intermediate its inner and outer peripheries. The inner ring is provided with two bayonet slots 35 for mating relation with the housing member pins 12. An annular resilient packing member 36 is disposed between the inner and outer flanges 33 and 32 so that when the cover is telescoped onto the housing member, and held by the bayonet connection, the outer rim of the cylindrical portion 11 will press slightly into the packing 36 to provide a sand free seal between the cover and the housing.

A circular lens 34, preferably made out of Pyrex glass, fits inside the inner flange 33 and is sealed to the flange and ring by a suitable sealing compound or material 36a. A plurality of brackets 37 are fastened by screws 38 to the inner flange 33 to hold the lens, sealing material and ring in sealed relation.

As shown in Fig. 1, the housing 10 is provided with an outwardly projecting ear 41, to which are fastened semi-circular clamp members 42 and 43 for attachment to a tubular sand blasting nozzle.

Preferably, all metal parts of the device are made of aluminum, so as to make the lamp light enough in weight as to not hamper the operation of the sand blasting equipment. Thus, with the lamp attached to such equipment, the operator's hands are free for other operations as necessary in such work.

As may be seen, a lamp construction has been provided in which the lamp bulb 18 is completely sealed within the housing 10. In the event that the bulb burns out, no tools are required to replace the bulb. The cover 30 is easily removed by hand, and yet, when replaced, the interior of the housing is again sealed.

It is to be understood that the form of the invention herewith shown and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. In a lamp construction for attachment to a sand blasting nozzle, the improvement comprising an elongated tubular housing having a cylindrical portion at one end, a plurality of inwardly extending pins fixed to said cylindrical portion, a removable cover member comprising a flat ring member having two radially spaced apart annular and concentric flanges formed thereon and extending at right angles thereto, with the inner flange being formed generally intermediate the inner and outer peripheries of said ring and the outer flange being formed at the outer periphery of said ring, said cover member being telescopable onto said cylindrical portion of said housing with the cylindrical portion being telescoped between said inner and outer flanges, an annular compressible packing member carried by said ring between said flanges, a plurality of bayonet slots on said inner flange mating with said inwardly extending pins to hold said cover member in telescoped attachment with said housing member with the outer rim of the cylindrical portion compressed into said packing member, a transparent lens carried by said ring inside said inner flange, a sealing material disposed between said lens and said ring, and means for holding said lens, sealing material and ring in sealed relation.

2. A lamp construction for attachment to a sand blasting nozzle, comprising: an elongated tapered tubular housing having a cylindrical portion at its small end and a cylindrical portion at its large end, an inwardly extending annular flange formed in the small end cylindrical portion, a lamp socket mounted in said housing adjacent said small end thereof, an electrical cord connected to said socket and extending through said flange and out through said small end cylindrical portion, a retainer nut threadable into said small end cylindrical portion, a compressible annular packing member disposed within said small end cylindrical portion between said cord and said housing and between said retainer nut and said flange to seal against said cord and to serve as a strain preventer for said cord when said retainer nut is threaded into said small end cylindrical portion, a plurality of inwardly extending pins fixed to the large end cylindrical portion of said housing, a removable cover member comprising a flat ring member having two radially spaced apart annular and concentric flanges formed thereon and extending at right angles thereto, with the inner flange being formed generally intermediate the inner and outer peripheries of said ring and the outer flange being formed at the outer periphery of said ring, said cover member being telescopable onto the large end cylindrical portion of said housing with the cylindrical portion being telescoped between said inner and outer flanges, an annular compressible packing member carried by said ring between said flanges, a plurality of bayonet slots on said inner flange mating with said inwardly extending pins to hold said cover member in telescoped attachment with said housing member with the outer rim of the large end cylindrical portion compressed into said last named packing member, a transparent lens carried by said ring inside said inner flange, a sealing material disposed between said lens and said ring, means for holding said lens, sealing material and ring in sealed relation; and clamp means carried by said housing member for attaching said housing member to a sand blasting nozzle.

References Cited in the file of this patent

UNITED STATES PATENTS

| | | |
|---|---|---|
| D. 141,063 | Kiplock | May 1, 1945 |
| 629,291 | Hall et al. | July 18, 1899 |
| 1,792,398 | Rothen | Feb. 10, 1931 |
| 1,804,566 | Mullaney | May 12, 1931 |
| 1,821,955 | Wuelker | Sept. 8, 1931 |
| 2,273,316 | Georg et al. | Feb. 17, 1942 |
| 2,620,434 | Edmunds | Dec. 2, 1952 |